United States Patent
Melnikov et al.

(10) Patent No.: US 10,573,417 B2
(45) Date of Patent: Feb. 25, 2020

(54) METHOD FOR GUARANTEEING FAST REACTOR CORE SUBCRITICALITY UNDER CONDITIONS OF UNCERTAINTY REGARDING THE NEUTRON-PHYSICAL CHARACTERISTICS THEREOF

(71) Applicant: Joint Stock Company "AKME-Engineering", Moscow (RU)

(72) Inventors: Kirill Gennadievich Melnikov, Balabanovo (RU); Ivan Vladimirovich Tormyshev, Obninsk (RU); Said Mirfaisovich Sharikpulov, Barvikha (RU); Sergey Viktorovich Bulavkin, Moscow (RU); Aleksandr Ivanovich Filin, Moscow (RU); Stepan Artemovich Borovitsky, Moscow (RU)

(73) Assignee: Joint Stock Company "AKME-Engineering", Moscow (RU)

( * ) Notice: Subject to any disclaimer, the term of this patent is extended or adjusted under 35 U.S.C. 154(b) by 220 days.

(21) Appl. No.: 15/022,689

(22) PCT Filed: Mar. 19, 2014

(86) PCT No.: PCT/RU2014/000170
§ 371 (c)(1),
(2) Date: Mar. 17, 2016

(87) PCT Pub. No.: WO2015/065233
PCT Pub. Date: May 7, 2015

(65) Prior Publication Data
US 2016/0232994 A1    Aug. 11, 2016

(30) Foreign Application Priority Data
Oct. 31, 2013  (RU) ................ 2013148441

(51) Int. Cl.
*G21C 7/06* (2006.01)
*G21C 7/08* (2006.01)
(Continued)

(52) U.S. Cl.
CPC .............. *G21C 7/08* (2013.01); *G21C 9/02* (2013.01); *G21C 11/06* (2013.01); *G21C 21/18* (2013.01);
(Continued)

(58) Field of Classification Search
CPC ..................................... G21C 17/104
(Continued)

(56) References Cited

U.S. PATENT DOCUMENTS 4,655,989 A * 4/1987 Kawashima ............. G21C 1/02
376/219
5,742,655 A    4/1998 Framatome et al.
(Continued)

FOREIGN PATENT DOCUMENTS

GB   1148093   4/1969
RU   1831170   8/1995
(Continued)

OTHER PUBLICATIONS

International Preliminary Report on Patentability dated May 3, 2016.
(Continued)

*Primary Examiner* — Marshall P O'Connor
(74) *Attorney, Agent, or Firm* — Preston Smirman; Smirman IP Law, PLLC

(57) ABSTRACT

A method for guaranteeing fast reactor core subcriticality under conditions of uncertainty involves, after assembling the reactor core, conducting physical measurements of reactor core subcriticality and comparing the obtained characteristics with design values; then, if there is a discrepancy
(Continued)

between the values of the obtained characteristics and the design values, installing adjustable reactivity rods in the reactor at the level of a fuel portion of the reactor core, wherein the level of boron-B10 isotope enrichment of the adjustable reactivity rods is selected to be higher than the level of boron-B10 isotope enrichment of compensating rods of the reactor core. The technical result consists in improving the operating conditions of absorbing elements of a compensating group of rods, eliminating the need for increasing the movement thereof, simplifying monitoring technologies used during production, and simplifying the algorithm for safe reactor control.

2 Claims, 1 Drawing Sheet

(51) Int. Cl.
  *G21C 9/02* (2006.01)
  *G21C 11/06* (2006.01)
  *G21C 21/18* (2006.01)
  *G21C 11/00* (2006.01)
(52) U.S. Cl.
  CPC .............. *G21C 11/00* (2013.01); *Y02E 30/34* (2013.01); *Y02E 30/39* (2013.01)
(58) Field of Classification Search
  USPC ................................................ 376/219, 261
  See application file for complete search history.

(56) References Cited

U.S. PATENT DOCUMENTS

| | | | |
|---|---|---|---|
| 8,654,916 B2* | 2/2014 | Grossetete | G21C 7/00 376/216 |
| 2005/0135547 A1 | 6/2005 | Schulz | |
| 2009/0190710 A1* | 7/2009 | Sakai | G21C 1/02 376/219 |
| 2013/0101077 A1* | 4/2013 | Drudy | G21C 7/08 376/237 |

FOREIGN PATENT DOCUMENTS

| | | |
|---|---|---|
| RU | 2167456 | 5/2001 |
| RU | 2218613 | 12/2003 |
| RU | 2442234 | 2/2012 |

OTHER PUBLICATIONS

Translation of Written Opinion of the International Searching Authority dated Aug. 28, 2014.
Written Opinion of the International Searching Authority dated Aug. 28, 2014.
Translation of International Search Report dated Aug. 14, 2014.
International Search Report dated Aug. 14, 2014.
English Abstract of SU1831170.
Russian language web page entitled "BREST-OD-300" dated Jan. 25, 2004, retrieved from https://www.technics.rin.ru/index/?a3&id=610 on Jun. 26, 2018.
English translation of web page entitled "BREST-OD-300" dated Jan. 25, 2004, retrieved from https://www.technics.rin.ru/index/?a3&id=610 on Jun. 26, 2018.

* cited by examiner

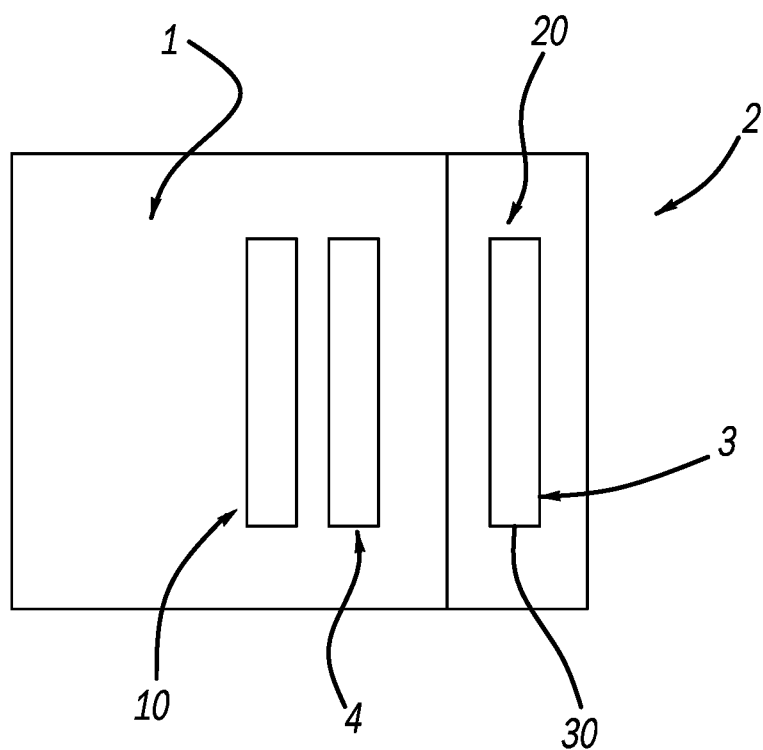

METHOD FOR GUARANTEEING FAST REACTOR CORE SUBCRITICALITY UNDER CONDITIONS OF UNCERTAINTY REGARDING THE NEUTRON-PHYSICAL CHARACTERISTICS THEREOF

CROSS-REFERENCE TO RELATED APPLICATION

The instant application is a national phase of PCT International Application No. PCT/RU2014/000170 filed Mar. 19, 2014, and claims priority to Russian Patent Application Serial No. 2013148441, filed Oct. 31, 2013, the entire specifications of both of which are expressly incorporated herein by reference.

FIELD OF THE INVENTION

The invention relates to a method for guaranteeing fast reactor core subcriticality under conditions of uncertainty regarding the neutron-physical characteristics thereof with the help of adjustable reactivity rods in nuclear power and can be used in fast-neutron power plants.

PRIOR ART

A method of nuclear reactor control is known, wherein a reflector surrounding the nuclear reactor core is composed of a number of elements mounted so as to allow rotation relative to one another to vary the size of the voids or voids of neutron free path through the reflector for reactivity control of the core (GB 1148093, G21C7/28, 1969).

A method of implementation of the nuclear tube reactor fuel cycle by forming a core by means of the loading of fuel assemblies with a distributed neutron absorber in the process of scheduled rearrangements and removals of fuel assemblies, scheduled movements of control and protection system rods and replacement of additional absorbers by partially burnt fuel assemblies, wherein, during reactor operation after the unloading of all additional absorbers, a part of the fully immersed control and protection system rods are replaced by cluster rods, and uranium-erbium fuel with initial $U^{235}$-enrichment 0.2 to 0.5% above the initial enrichment of uranium-erbium fuel loaded before removal of the control and protection system rods is used as fuel (RU 2218613, G21C7/04, G21D3/08, 2003).

A method of examination of physical characteristics of the core of a high-temperature nuclear reactor with spherical fuel elements on a critical assembly is known consisting in that the core is heated by a heater that creates a certain temperature distribution field within the pebble, then the position and dimensions of the core and reflectors are changed in relation to the set temperature field generated by the heater by partial replacement of fuel elements at the core periphery with balls of the reflector material, and vice versa (SU 1831170, G21C17/00, G21S1/00, 1995).

A method for constructing subcritical nuclear devices that are controlled by the part of the reflector adjacent to the core and a nuclear reactor implementing the method are known (Patent RU 2167456, G21C 1/00, G2105/00, G21C7/28, May 20, 2001). Cavities in the shape of through channels are made in the core of a nuclear reactor with a core, neutron moderators, fissile elements, reflectors, part of the reflectors are movable. The device design allows to maintain neutron spectra in cores that are characteristic of fast reactor, while obtaining a thermal neutron spectrum in the laser element cavity. Based on the obtained results and known facts on high power channel-type reactors, it has been shown that they may be transformed to subcritical reactor units that may be adequately controlled by a part of the side reflector, thus eliminating the possibility of formation of local critical masses and converting the positive void coefficient into negative one.

The above analogs are not intended to guarantee fast reactor core subcriticality under conditions of uncertainty resulting in deviation of the actual characteristics from the design values.

Currently, the algorithm of safe control and protection system rod control is used to compensate for the reactivity margin for burnup and control reactor neutron power in some fast-neutron reactor plant designs, according to which some rods immersed in the core and compensating for burnup are disconnected from the control system. Other rods maintain criticality and control power. Thus, the entire shim rod system is divided into two groups: a group of disconnected rods compensating for reactivity variation in the campaign that are not involved in the automatic control of the shim rod group installation, and a group of working shim rods that, together with the control rods, participate in the installation control. The campaign is implemented in intervals (intervals between refuelings) corresponding to the generation of reactivity is equal to the efficiency of one or two groups of shim rods.

The closest analog of the invention is a method guaranteeing fast reactor core subcriticality using "light" control rods without strict requirements for response time that are located in the reflector modules near the core boundary, which is trial-run in the BREST-OD-300 fast-neutron reactor design with a core characterized by small margins and effects of reactivity, allowing to use "light" control rods without strict requirements for response time by placing them in the reflector modules near the core boundary (https://www.technics.rin.ru/index/?a=3&id=610).

A disadvantage of the closest analog is its limited use in case of uncertainty of physical characteristics of the nuclear reactor core due to either a lack of experimental data on physical characteristics of the core, or a subcriticality margin smaller than a fraction of delayed neutrons for the set fueling of the reactor that is not sufficient to compensate for uncertainties leading to deviation of the actual performance from the design values.

Invention Disclosure

The task completed by the invention is based on the need to comply with requirements of regulatory documents on RP core subcriticality after emergency protection arming of at least 1% and requires increased accuracy of justification of the key physical characteristics of the core, namely, accurate determination of core fueling and control and protection system rod weights.

The task is required to be completed due to the fact that a number of uncertainties resulting in deviation of the actual performance form the design values are to be considered in the development and justification of neutron-physical and thermohydraulic characteristics of the core:

process uncertainties of manufacture of the core elements and RP components;
errors in calculation of basic functionalities (effective multiplication factor, control and protection system rod "weights", power density fields);
constant;
methodical;
systematic.

The prior art discloses that only physical experiments on reactors can ensure the accuracy of determination of core fueling and protection system rod weights.

The proposed method allows to guarantee fast reactor core subcriticality under conditions of uncertainty regarding neutron-physical characteristics thereof without experiments. This is made possible due to new essential features of the invention, namely, due to placement of adjustable reactivity rods in the core side reflector to increase the subcriticality margin (by a value of not less than the proportion of delayed neutrons) sufficient to compensate for uncertainties resulting in deviation of the actual characteristics from the design values, wherein the enrichment of the core shim rods with B10 boron isotopes is lower than that of the adjustable reactivity rods in the core side reflector.

The technical result of the implementation of the claimed method is:
- elimination of increased conservatism resulting in more stressful operating conditions of absorber elements (AE) of the shim rod bank (SR);
- elimination of the need to increase the stroke of the shim rods and simplification of control process during the manufacture;
- elimination of the need to develop AE for each specific nuclear reactor to ensure the required subcriticality margin throughout the whole campaign with required operability for the entire life cycle of the core;
- simplification of the safe reactor control algorithm.

The above technical results are achieved by means of adjustable reactivity rods in the core reflector module slots or in the core reflector slots that are installed at the core fuel portion level, wherein the enrichment of the core shim rods with B10 boron isotopes is lower than that of the adjustable reactivity rods in the core side reflector.

If necessary, adjustable reactivity rods with an insufficient enrichment are replaced with adjustable reactivity rods or an assembly thereof with enrichment sufficient to ensure the design subcriticality by replacement of some core reflector modules with replacement reflector modules with adjustable reactivity rods with the desired enrichment.

Availability of adjustable reactivity rods improves shim rod bank AE operating conditions, as the adjustable reactivity rods of the core side reflector perform the main part of functions to eliminate deviations of the actual core neutron-physical and thermohydraulic characteristics from the design values. Accordingly, the safe reactor control algorithm is simplified. As the enrichment of the adjustable reactivity rods of the core side reflectors at the fuel portion level is higher than that of the shim rods of the core, a more "rough" adjustment is performed by the adjustment reactivity rods in the core side reflector. At the same time, the core characteristics close to the design values during assembly, commissioning and operation of the core are ensured by shorter rod travel in the shim rod bank.

BRIEF DESCRIPTION OF THE FIGURES

The drawing shows a scheme of the nuclear reactor core.

IMPLEMENTATION OF THE INVENTION

The nuclear reactor comprises a vessel (omitted in the drawing), where the core 1 is located, surrounded by the core reflector 2. The core 1 comprises fuel assemblies made up of rod-type fuel elements (FE), wherein one or several fuel assemblies comprise shim rods with absorber elements (AE) (e.g., compensating rods 10) forming a shim rod bank. The rods of the shim rod bank allow vertical shifting.

The core reflector 2 may be constructed of separate replaceable modules (e.g., replacement core reflector modules 20). Slots 30 are made at the core fuel portion level in the core reflector 2 (FIG. 1) or core reflector replacement modules for adjustable reactivity rods. The core reflector 2 or its separate modules may be designed so as to allow insertion and removal of adjustable reactivity rods in/from the slots.

Enrichment of the core shim rod bank by B10 boron isotope is selected lower than that of the adjustable reactivity rods 3 installed in the core reflector modules.

In accordance with the claimed method, process uncertainties, errors (constant, methodical, systematic) of calculated values of the main functionalities (effective multiplication factor, control and protection system rod "weights", power density fields) are compensated at the core 1 assembly stage as follows.

After assembly of the core 1, physical measurements of core subcriticality are performed according to the known methods and the obtained characteristics are compared with the design values.

In case of discrepancy between the obtained and design values, adjustable reactivity rods with enrichment ensuring the design subcriticality are installed in the reactor at the fuel portion 4 level.

After installation of the adjustable reactivity rods at the core fuel portion level, additional physical measurements of core subcriticality are performed and, if discrepancies between the obtained and design values are found again, some of the core reflector 2 modules with adjustable rods reactivity are replaced with reflector replacement modules with adjustable reactivity rods with a different enrichment, namely, the one necessary and sufficient to obtain the desired design subcriticality value.

Furthermore, process uncertainties, errors may be compensated without partial replacement of core reflector modules. In this case, adjustable reactivity rods are inserted in the slots of the reflector 2 or reflector module (s) of the or are removed from the slots of the reflector 2 or reflector module (s) and replaced with adjustable reactivity rods with the required enrichment that allows to obtain the set subcriticality value.

Core characteristics are fine-tuned by means of AE of the core shim rods installed in the fuel assemblies in the core.

The number of adjustable reactivity rods and side reflector modules with adjustable reactivity rods installed in the same is determined after neutron-physical measurements are performed in order to check the acceptance characteristics of the core during its assembly.

Use of adjustable reactivity rods provides a greater margin during operation of the nuclear reactor due to the fact that the shim rod bank AE control the characteristics of the core operating under conditions close to the design conditions both during commissioning and in the course of operation, which is possible due to a shorter travel of the shim rods.

For instance, for a specific core design, enrichment of the adjustable reactivity rods by B10 boron isotope may be higher (up to 80-90%) than that of the core shim rods that may amount to 40-50%. In other cases, the enrichment of the core shim rods by B10 boron isotope may reach 90%, then the enrichment of adjustable rods may reach 96%. However, their efficiency will depend on the number of 93% rods in the core. If they are few and the average enrichment is below 93%, then the higher the enrichment of the adjustable rods is, the higher their efficiency.

The invention claimed is:

1. A method for controlling reactivity of a fast reactor under conditions of uncertainty, wherein the fast reactor includes a reactor core, comprising the steps of:
   conducting physical measurements of reactor core subcriticality;
   after assembly of the reactor core, comparing obtained values with design values of neutron-physical characteristics of the reactor core;
   wherein, if there is a discrepancy between the obtained values with the design values of the neutron-physical characteristics of the reactor core, installing adjustable reactivity rods in the fast reactor at a level of a fuel portion of the reactor core;
   wherein a level of boron-B10 isotope enrichment of the adjustable reactivity rods is selected to be higher than the level of boron-B10 isotope enrichment of compensating rods of the reactor core;
   wherein the adjustable reactivity rods are located in one or more replaceable core reflector modules;
   wherein the adjustable reactivity rods are inserted in core reflector slots formed in the replaceable core reflector modules; and
   wherein after installation of the adjustable reactivity rods at the core fuel portion level, additional physical measurements of the core subcriticality are performed, and in the event of a discrepancy between the obtained and design values, the adjustable reactivity rods with an insufficient enrichment are replaced with adjustable reactivity rods with an enrichment ensuring subcriticality of the reactor core, wherein the adjustable reactivity rods are replaced by removal of one or more of the replaceable core reflector modules and replacing the replaceable core reflector modules with the adjustable reactivity rods of a required enrichment.

2. A method for controlling reactivity of a fast reactor under conditions of uncertainty, wherein the fast reactor includes a reactor core, comprising the steps of:
   conducting physical measurements of reactor core subcriticality;
   after assembly of the reactor core, comparing obtained values with design values of neutron-physical characteristics of the reactor core;
   wherein, if there is a discrepancy between the obtained values with the design values of the neutron-physical characteristics of the reactor core, installing adjustable reactivity rods in the fast reactor at a level of a fuel portion of the reactor core;
   wherein a level of boron-B10 isotope enrichment of the adjustable reactivity rods is selected to be higher than the level of boron-B10 isotope enrichment of compensating rods of the reactor core;
   wherein the adjustable reactivity rods are located in one or more replaceable core reflector modules; and
   wherein the adjustable reactivity rods are inserted in core reflector slots formed in the replaceable core reflector modules; and
   wherein after installation of the adjustable reactivity rods at the core fuel portion level, additional physical measurements of the core subcriticality are performed, and in the event of a discrepancy between the obtained and design values, the adjustable reactivity rods with an insufficient enrichment are replaced with adjustable reactivity rods with an enrichment ensuring subcriticality of the reactor core, wherein the adjustable reactivity rods are replaced by removal of adjustable reactivity rods from the core reflector slots and their replacement with other adjustable reactivity rods of a required enrichment.

* * * * *